(12) United States Patent
Son

(10) Patent No.: US 10,554,442 B2
(45) Date of Patent: Feb. 4, 2020

(54) APPARATUS AND METHOD FOR LOAD BALANCING AMONG MULTI-PORTS IN REVERSE POWER FEEDING

(71) Applicant: UBIQUOSS INC., Seongnam-si, Gyeonggi-do (KR)

(72) Inventor: Dong Il Son, Seongnam-si (KR)

(73) Assignee: UBIQUOSS INC. (KR)

( * ) Notice: Subject to any disclaimer, the term of this patent is extended or adjusted under 35 U.S.C. 154(b) by 176 days.

(21) Appl. No.: 15/803,523

(22) Filed: Nov. 3, 2017

(65) Prior Publication Data
US 2018/0123825 A1 May 3, 2018

(30) Foreign Application Priority Data

Nov. 3, 2016 (KR) .................. 10-2016-0145824

(51) Int. Cl.
| | |
|---|---|
| H04L 12/40 | (2006.01) |
| H04M 19/08 | (2006.01) |
| H04L 12/12 | (2006.01) |
| H04L 12/28 | (2006.01) |
| H04L 12/24 | (2006.01) |
| H04Q 11/00 | (2006.01) |
| H04M 3/22 | (2006.01) |

(52) U.S. Cl.
CPC ........ *H04L 12/40045* (2013.01); *H04L 12/12* (2013.01); *H04L 12/2885* (2013.01); *H04L 12/2898* (2013.01); *H04L 41/0833* (2013.01); *H04M 19/08* (2013.01); *H04Q 11/0067* (2013.01); *H04M 3/2209* (2013.01); *Y02D 50/40* (2018.01)

(58) Field of Classification Search
CPC ............... H04L 12/40045; H04L 12/12; H04L 12/2885; H04L 12/2898; H04L 41/0833; H04M 19/08; H04M 3/2209; H04Q 11/0067; Y02D 50/40
See application file for complete search history.

(56) References Cited

U.S. PATENT DOCUMENTS

| | | | |
|---|---|---|---|
| 8,897,431 B2 | 11/2014 | Hansen et al. | |
| 9,319,537 B2 | 4/2016 | Peker et al. | |
| 2015/0304508 A1* | 10/2015 | Peker .................. | H04M 19/003 379/24 |

(Continued)

*Primary Examiner* — Jared Fureman
*Assistant Examiner* — Aqeel H Bukhari
(74) *Attorney, Agent, or Firm* — Renaissance IP Law Group LLP

(57) ABSTRACT

The present invention relates to an apparatus and a method for load balancing among multi-ports in reverse power feeding, and more particularly, to an apparatus and a method which, in the process in which a distribution apparatus performs load balancing among multi-ports by reversely receiving power from multiple customer premises at a distribution point, when reverse power feeding from a specific customer premise is stopped, since a power burden of a remaining customer premise is increased, which interfere with a communication service, can reduce power consumption on the distribution by releasing a link of a communication port connected with the corresponding customer premise as soon as the power feeding is stopped and provide a stable communication service by performing the load balancing only with respect to remaining communication ports.

10 Claims, 4 Drawing Sheets

(56) References Cited

U.S. PATENT DOCUMENTS

2015/0341081 A1* 11/2015 Rao .................... H04B 3/32
370/201
2017/0110885 A1* 4/2017 Cheng .................. H04L 12/10
2018/0006719 A1* 1/2018 Cress .................. H04B 10/071

* cited by examiner

APPARATUS AND METHOD FOR LOAD BALANCING AMONG MULTI-PORTS IN REVERSE POWER FEEDING

CROSS-REFERENCE TO RELATED APPLICATION

This application claims priority to and the benefit of Korean Patent Application No. 10-2016-0145824 filed in the Korean Intellectual Property Office on Nov. 3, 2016, the entire contents of which are incorporated herein by reference.

TECHNICAL FIELD

The present invention relates to an apparatus and a method for load balancing among multi-ports in reverse power feeding, and more particularly, to an apparatus and a method which, in the process in which a distribution apparatus performs load balancing among multi-ports by reversely receiving power from multiple customer premises at a distribution point, when reverse power feeding from a specific customer premise is stopped, since a power burden of a remaining customer premise is increased, which interfere with a communication service, can reduce power consumption on the distribution by releasing a link of a communication port connected with the corresponding customer premise as soon as the power feeding is stopped and provide a stable communication service by performing the load balancing only with respect to remaining communication ports.

BACKGROUND

An access network refers to a communication network for providing high-speed data services to customers based on existing constructed telephone lines, coaxial cables, or optical cables.

In general, the access network is divided into a distribution point (DP) and a customer premise (CP), and a distribution point unit (DPU) (hereinafter, referred to as DPU) provided at the distribution point generally operates with a power supply device itself, but when the DPU is located in an underground or a manhole, it is difficult to directly connect an independent power source.

In order to solve such a problem, in recent years, a reverse power feeding system that supplies power from the customer premise to the distribution point in a reverse direction has been developed and commercialized.

The reverse power feeding system comprises a reverse power feeding device for reversely supplying power to at least one customer premise and is connected to a powered device (PD) provided at the distribution point to supply power to the DPU.

Further, the distribution point may be configured to comprise one or more DPUs, and each DPU may be configured to comprise a single port or multiple ports with multiple ports. In addition, the DPU is connected with multiple customer premises through respective ports to provide xDSL data service.

The reverse power feeding device provided on the customer premise comprises a power sourcing equipment (PSE) device that injects AC power applied from the outside into a line (telephone line) to perform reverse power feeding and the PD provided at the distribution point receives power from the PSE device and supplies the received power to the DPU.

In such a structure, it is very important for the distribution point to provide the communication service to the customer premise provided with the reverse power feeding in order to operate the DPU by receiving the reverse power from multiple customer premises and performing the load balancing.

Next, a brief description will be given of the prior art in the technical field of the present invention, and then, a technical matter which the present invention intends to differentiate from the prior art will be described.

First, U.S. Pat. No. 9,319,537 (Apr. 19, 2016) relates to a technique for load balancing of reverse power feeding for estimating communication line power loss in a general communication system and relates to a technique which performs balancing for power supplied from a customer premise by receiving power multiple PDs receiving power in connection with multiple PSE devices at the distribution point and estimating the communication line power loss.

The prior art has some similarities to the present invention because the prior art provides a general technique for performing the load balancing and supplying power required for driving the DPU provided on the distribution point. On the other hand, according to the present invention, when the reverse power feeding is interrupted from a specific customer premise in the process of receiving reverse power from multiple customer premises, the link of the communication port connected to the customer premise is rapidly immediately blocked immediately upon detecting the interruption and unnecessary power consumption due to the communication port is prevented early so as to stably drive the DPU with the reverse power provided from the remaining customer premises. The prior art does not describe or suggest such a technical feature.

Further, U.S. Pat. No. 8,897,431 (registered on Nov. 25, 2014), which relates to a technique for feeding power to an outdoor broadband cabinet is a technique that receives power from the customer premise without using local power in order to increase efficiency of miniaturization and installation of the cabinet.

The prior art has some similarities with the configuration for controlling the power supply from the reverse power feeding to the distribution device on the customer premise of the present invention in that power is supplied from the customer equipment to the cabinet. However, the prior art merely suggests a configuration for the reverse power feeding. On the other hand, the present invention has been made in an effort to provide an apparatus and a method in which when the DPU provided on the distribution point is connected to the customer premise and receiving the reverse power from the customer premise, the power received from each customer premise is sensed and a specific customer premise which interrupts the reverse power feeding is detected to immediately block the link for the communication port connected to the customer premise and perform load balancing only with respect to the remaining ports so that the power for the corresponding DPU can be stably supplied and instability in the operation of the entire DPU can be solved due to the interruption of the reverse power feeding of the DPU.

SUMMARY

An exemplary embodiment of the present invention is contrived to solve the problem and has been made in an effort to provide an apparatus and a method which can stably receive power required for driving a DPU by performing load balancing for each communication port provided in the DPU in the process of providing power to the DPU by receiving power from a customer premise in a reverse direction.

An exemplary embodiment of the present invention has been made in an effort to provide an apparatus and a method which sense power received from multiple customer premises, detect whether power is supplied between the distribution point and the customer premise, rapidly detect that total power consumption of the DPU provided on the distribution point is changed through the detected power supply, and performs the load balancing based on the detected change to enable the DPU to be stably driven.

Further, an exemplary embodiment of the present invention has been made in an effort to provide an apparatus and a method which constantly monitor that reverse power feeding from a specific customer premise is interrupted and sense the interruption of the reverse power feeding in real time, rapidly block the link of the communication port connected with the customer premise which interrupts the reverse power feeding, immediately stop xDSL data service to the corresponding customer premise, and perform the load balancing only with respect to remaining communication ports other than the corresponding communication port to prevent unnecessary power consumption by the corresponding port early, reduce overall power consumption of the DPU, and stably provide the service, thereby stably providing the xDSL data service to the customer premise who normally performs the reserve power supply.

An exemplary embodiment of the present invention provides an apparatus for load balancing among multi-ports in reverse power feeding, comprising: a power reception sensing unit sensing whether reverse power is supplied from at least one customer premise; and a load balancing unit performing the load balancing among the multi-ports according to a sensing result, in which the load balancing allows reverse power feeding from the customer premise and power consumption at a distribution point to be constantly maintained.

When it is determined that the reverse power feeding is interrupted as the sensing result, a link for the corresponding communication port is immediately released and the corresponding communication port is excluded from a target of a communication service to stably perform the load balancing only among remaining communication ports.

In the apparatus for load balancing among multi-ports in reverse power feeding, one PDU comprises at least one communication port and is connected with the customer premise through each communication port and when the reverse power feeding is interrupted from a specific customer premise, the link with the corresponding communication port is immediately blocked to reduce power required for maintaining connection with the link, and as a result, the load balancing is performed among the remaining communication ports.

The power reception sensing unit may sense whether power by the reverse power feeding is received directly from a line connected with the customer premise or sense whether the power by the reverse power feeding is received by monitoring power received from a PD.

The apparatus for load balancing among multi-ports in reverse power feeding may further comprise a power collecting unit collects the power received from the reverse power feeding device of the customer premise through the PD, in which the collected power is used as source power required for stably operating DP side equipment comprising a DPU and an ONU/ONT.

The apparatus for load balancing among multi-ports in reverse power feeding may further comprise a load balancing control unit may immediately release the link in the corresponding communication port in real time by receiving information regarding whether the power is received for each customer from the power reception sensing unit and providing port information in which the reverse power feeding is not performed to the DPU based on the information regarding whether the power is received to control the load balancing to be performed. However, here, the load balancing may be executed by the DPU. The DPU may sense that there is no reverse power in real time and in this case, the signal may be supplied from the PD.

Another exemplary embodiment of the present invention provides a method for load balancing among multi-ports in reverse power feeding, comprising: a power reception sensing step of sensing whether reverse power is supplied from at least one customer premise; and a load balancing step of performing the load balancing among the multi-ports according to a sensing result, in which the load balancing allows reverse power feeding from the customer premise and power consumption at a distribution point to be constantly maintained.

As described above, according to an apparatus and a method for load balancing among multi-ports in reverse power feeding of the present invention, a state of the reverse power feeding performed from multiple customer premises is sensed, a link is controlled to be set with respect to communication ports substantially operated based on the sensed state, and the load balancing is performed so that the reverse power feeding from the customer premise and power consumption on a distribution point are constantly maintained to reduce unnecessary power consumption and achieve stable power consumption in a DPU.

In addition, in the present invention, when the power received from the multiple customer premises is sensed and the reverse power feeding is interrupted from a specific customer premise, the link of the communication port connected with the corresponding customer premise is immediately interrupted to reduce power consumption in the DPU, thereby reducing a power burden on the customer premise.

In addition, the load balancing is performed only with the remaining communication ports except the communication service for the communication port connected to the customer premise in which the reverse power feeding is interrupted, so that the DPU comprising the multi-ports can continuously operate stably, thereby providing a stable communication service to the customer.

BRIEF DESCRIPTION OF THE DRAWINGS

For more complete understanding of this disclosure, reference is now made to the following brief description, taken in connection with the accompanying drawings and detailed description.

DETAILED DESCRIPTION

Figure 1:
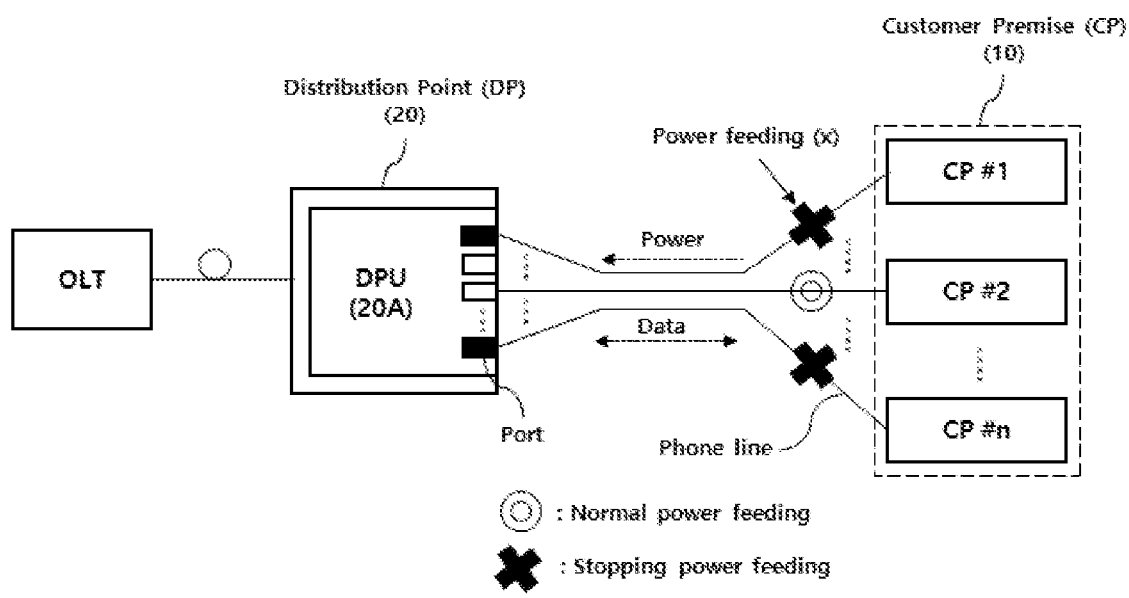
FIG. 1 is a conceptual view for schematically describing an apparatus for load balancing among multi-ports in reverse power feeding according to an exemplary embodiment of the present invention.

Hereinafter, an apparatus and a method for reverse power feeding according to the present invention will be described in detail with reference to the accompanying drawings. The present invention may be implemented in various different forms and is not limited to exemplary embodiments described herein. Throughout the specification, like reference numerals refer to like elements.

Hereinafter, an apparatus for load balancing among multi-ports which is the present invention will be described with reference to FIGS. 1 and 2.

Figure 2:
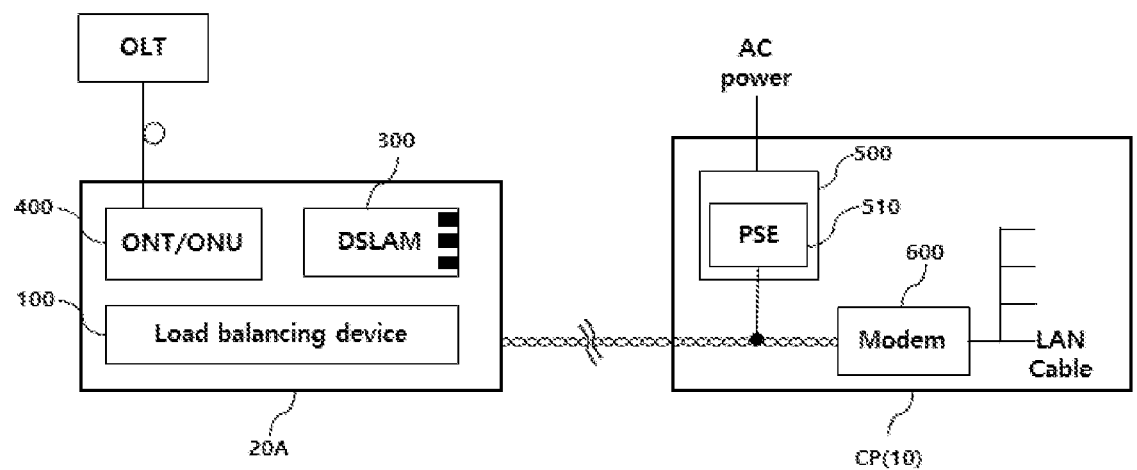
FIG. 2 is a diagram illustrating an apparatus for load balancing among multi-ports in reverse power feeding, which is provided on a distribution point and an apparatus for reverse power feeding, which is provided on a customer premise according to an exemplary embodiment of the present invention.

FIG. 1 is a conceptual view for schematically describing an apparatus for load balancing among multi-ports in reverse power feeding according to an exemplary embodiment of the present invention and FIG. 2 is a diagram illustrating an apparatus for load balancing among multi-ports in reverse power feeding, which is provided on a distribution point and an apparatus for reverse power feeding, which is provided on a customer premise according to an exemplary embodiment of the present invention.

As illustrated in FIG. 1, a distribution point (DP) 20 may be configured to comprise one or more DPUs, and each DPU may be configured to comprise a single port or multiple ports with multiple ports. In addition, the DPU is connected with multiple customer premises through respective ports to provide xDSL data service.

In the present invention, the single DPU supporting the multi-ports having at least one communication port in one DPU will be described as an embodiment. However, in the present invention, one DPU may be extended to multiple DPUs and configured to have multiple DPUs on one distribution point (DP).

As illustrated in FIG. 1, a DPU 20A provided on the distribution point (DP) 20 is configured to comprise multi-ports comprising at least one port. The DPU 20A is connected to multiple customer premises through respective ports, respectively. In addition, multiple devices including a PC, a TV, a telephone, and the like are connected to a modem on the CP 10 via a LAN cable, or the like.

The present invention relates to an apparatus and a method for performing load balancing among multi-ports of the DPU in a structure in which the DPU and the CP are connected by a telephone line, and when reverse power is supplied from the CP to the DPU, a bidirectional data communication service is performed between the DPU and the CP.

In addition, the reverse power feeding is made from the customer premise to the distribution point and data communication is performed between the distribution point and the customer premise. At this time, the data communication is available only for a line on which the reverse power is supplied. In other words, if there is no reverse power feeding, it should be regarded that there is also no need for the data communication from the customer premise.

Even if there is the reverse power feeding from one customer premise for an actual normal operation of the DPU, the DPU needs to operate normally to provide the communication service and thus the DPU needs to be should be designed as such. However, when the communication services need to be performed for a larger number of customers even though there are very few subscribers to supply power in the reverse direction, an imbalance in the supply and consumption of electricity will be caused and when the imbalance is severe, the DPU will eventually shut down. Even if the reverse power feeding is interrupted, when the DPU continuously tries to continue the communication service through the corresponding communication port, the supply and demand of the power becomes temporarily unstable, and the operation of the DPU will become unstable. FIG. 1 is a diagram for describing a concept in which an unstable situation occurs in such power supply and demand.

As illustrated in FIG. 2, the DPU 20A may be configured to comprise an ONU/ONT 400 constituting a passive optical network (PON) together with an OLT and a digital subscriber line access multiplexer (DSLAM) 300 and of course, may comprise an interface for connection with various data networks comprising a dedicated network instead of the ONU/ONT 400.

Therefore, since the DPU 20A comprises functions of the ONU/ONT 400 and the DSLAM 300, an optical interface with the OLT, a telephone line interface with the CP, a control unit that controls transmission/reception of data through the interface, and a power supply unit for supplying power to the control unit will be needed.

Here, since the DPU 20A does not have a structure in which the DPU 20A operates by autonomously generating operating power through receiving AC power but the DPU 20A is driven by receiving power from the customer premise, a separate power interface is required, which allows a function of the normal ONU/ONT 400 or DSLAM 300A for a power supply unit to operate in combination with power received from the CP. In the power interface, a load balancing device 100 serves to collect and combine power supplied through a PD 200 and supply the collected and combined power to the ONU/ONT 400 or the DSLAM 300A.

That is, the DPU 20A provided on the DP 20 is connected to the optical line terminal (OLT) through the ONU/ONT 400 and is connected to one or more CPs 10 through the telephone line via each communication port to an xDSL data service to each customer.

Further, since the DPU 20A is driven by remotely supplying power, the DPU 20A is driven in the reverse direction from a PSE device 510 of a reverse power feeding device 500 provided at the CP 10 in order to provide the xDSL data service to the customer.

The reverse power feeding device 500 transmits a detection signal for detecting the PD 200 to the telephone line to preferentially check whether the DPU 20A is connected to the telephone line and when the reverse power feeding device 500 determines that the DPU 20A is connected to the telephone line, the reverse power feeding device performs reverse power feeding to the corresponding PD 200.

In other words, the reverse power feeding device 500 provided in the CP 10 converts AC power applied from the outside into DC power and performs reverse power feeding to supply power to the PD 200. At this time, since the PSE 510 may supply power by adjusting a voltage level according to a class sensed through the PD 200, power as much as required amount is supplied for each subscriber. The supplied power from each customer premise is collected to operate the DPU.

In other words, the DPU 20A is connected to multiple CPs 10 through multi-ports via the telephone line, and the PD 200 receives power supplied from the PSE device 510 on the CP 10 in a reverse direction is a component that receives power by the reverse power feeding of the PSE device 510 and one PD 200 is provided for each telephone line and is connected to receive power supplied from the PSE device 510 in the reverse direction.

The PD 200 receives the reverse power provided from the PSE device 510 on the CP 10 through the telephone line and provides the power to the load balancing device 100. The load balancing device 100 receives power input from each PD 200 and supplies the collected power to the DPU 20A with the multi-ports to allow the ONT/ONU 400 and the DSLAM 300 corresponding to the respective communication ports to operate.

At this time, the load balancing device 100 monitors the power input from each PD 200 to detect whether the power is received in the reverse direction or whether power is directly received by the reverse power feeding from lines connected with the multiple CPs 10. Accordingly, the load balancing device 100 may check in real time whether the reverse power is supplied at a few communication ports at present, and detects a port that actually supplies power to the corresponding DPU 20A and performs the load balancing only with respect to the corresponding port to control power amounts supplied from the CPs to be equal to each other.

However, since all of the customer premises not continuously use the xDSL data service and all communication ports of the DPU do not maintain connection with the customer premise (the connection of the lines is actually physically maintained, but whether to supply power may be changed), the load balancing needs to be performed by considering various situations. That is, when a specific customer premise intends to terminate the communication service while performing the reverse power feeding for the communication service, the specific customer premise will stop the reverse power feeding. Therefore, there is a case where the customer premise performs the reverse power feeding and stops the supply of the reverse power and there is a problem that the distribution point tries to continue the communication service without knowing the stopping or it takes a long time to release the link to the communication port.

For example, when the reverse power feeding device provided at nay specific customer premise stops supplying power, the DPU needs to also release the link of the communication port connected to the customer premise. If the link of the specific communication port is not immediately released even though the power supply by the reverse power feeding device connected to the specific communication port is interrupted, the DPU increases a power burden on the remaining customer premise and further, and the operation of the DPU is unstable. That is, due to power consumption for providing the communication service to an unnecessary communication port, the communication service to the customer premise to be normally connected and to be serviced becomes unstable, and the service is interrupted or a communication speed drops sharply.

In order to solve such a problem, a system for performing load balancing for a corresponding DPU is significantly needed by performing a procedure of terminating the data communication service after detecting the stop of the reverse power feeding from a specific customer premise at the distribution point.

However, in the load balancing in the related art, since a communication link between the distribution point and the customer premise is released through a separate procedure (for example, a process of releasing the communication link when an ACK signal is not received for a predetermined time or longer according to transmission/reception of a signal at a data link layer), a long time is required for releasing the communication link and since the load balancing is performed with respect to the DPU comprising the functions of the ONU/ONT and DSLAM functions for the communication port in which the reverse power feeding is interrupted for a long period of time, a load may increase even though sufficient power may not be supplied for driving the DPU comprising the corresponding port. This makes the overall operation of the DPU unstable (for example, if power is supplied from each customer premise connected to four ports in the reverse direction and the reverse power feeding is suddenly blocked at the customer premise for three ports, only the CP of one customer which remains actually supplies power, but the DPU at that moment consumes the same power as providing service to 4 customers, and as a result, the PSE of one customer may be overloaded and the power supply may be interrupted and since there is no supplied to the DPU at that moment, the power is turned off or reset) and furthermore, the DPU may not operate due to insufficient power supply and the corresponding DPU may be rebooted, and as a result, the communication service to be provided to the customer premise which is normally connected is influenced to be interrupted.

Accordingly, the present invention has been made in an effort to provide an apparatus and a method, in which the power received from the multiple customer premises is monitored to detect the interruption of the reverse power feeding from the specific customer premise and as soon as the interruption is detected, the link to the communication port connected to the customer premise is blocked to prevent unnecessary power consumption by the corresponding communication port early, and as a result, total power consumption of the DPU comprising the corresponding communication port is reduced to allow the DPU to be stably driven.

That is, the present invention has been made in an effort to provide an apparatus and a method in which by performing the load balancing stably only for the remaining communication ports connected to the customer premise in which the reverse power feeding is normally performed, it is possible to stably receive the power required for the operation of the DPU and to provide a stable communication service.

More specifically, when it is assumed that the DPU 20A is constituted by five telephone lines (communication port and power supply line) and three telephone lines are connected to the three CP 10 one to one, each of the PDs 200 provided for each of the telephone lines receives power supplied from the CP 10 connected to the respective telephone lines in the reverse direction and transfers the received power to the load balancing device 100. At this time, the load balancing device 100 performs the load balancing only on the three currently operating communication ports and supplies power received to the DPU 20A through the PD 200 to allow the respective communication ports to stably operate. That is, the load balancing is performed so as to provide the communication services only to the communication ports currently provided with the reverse power feeding so that the ONU/ONT 400 and the DSLAM 300 of the DPU 20A may stably consume power, reduce power consumption, and prevent the customer premise from increasing the power burden.

The load balancing device 100 monitors the power received from the multiple PDs 200 in real time to detect whether power is received by the reverse power feeding or detects whether power by the reverse power feeding is directly received from the line (e.g., the telephone line) connected to the CP 10 to determine a state of the reverse power feeding performed by each CP 10.

As a result of the detection of the reverse power feeding, when the power by the reverse power feeding from the specific CP 10 is not received (that is, when the reverse power feeding is blocked or interrupted), the load balancing device 100 immediately releases the link of the communication port connected with the specific CP 10 to block the xDSL data service through the corresponding communication port.

In other words, the load balancing device 100 detects the reverse power feeding state to the multiple CPs 10 and if it is determined that the reverse power feeding is blocked as a result of the detection, the link of the corresponding communication is immediately released without performing the communication link release process (for example, a communication link release process at a data link level in the related art) for the corresponding port to prevent the xDSL data service from being provided any longer through the corresponding communication port. The release of the link is preferably performed directly by the DPU. Therefore, the load balancing device according to the present invention may perform a function of equalizing output voltage of the PD.

Through this process, the DPU 20A connected to equipment on the multiple CPs 10 through the multi-ports continuously stably receives sufficient power for the total power consumption. As a result, a stable communication service may be provided to a normally connected customer.

Hereinafter, the load balancing device 100 will be described in detail with reference to FIGS. 3 and 4.

Figure 3:
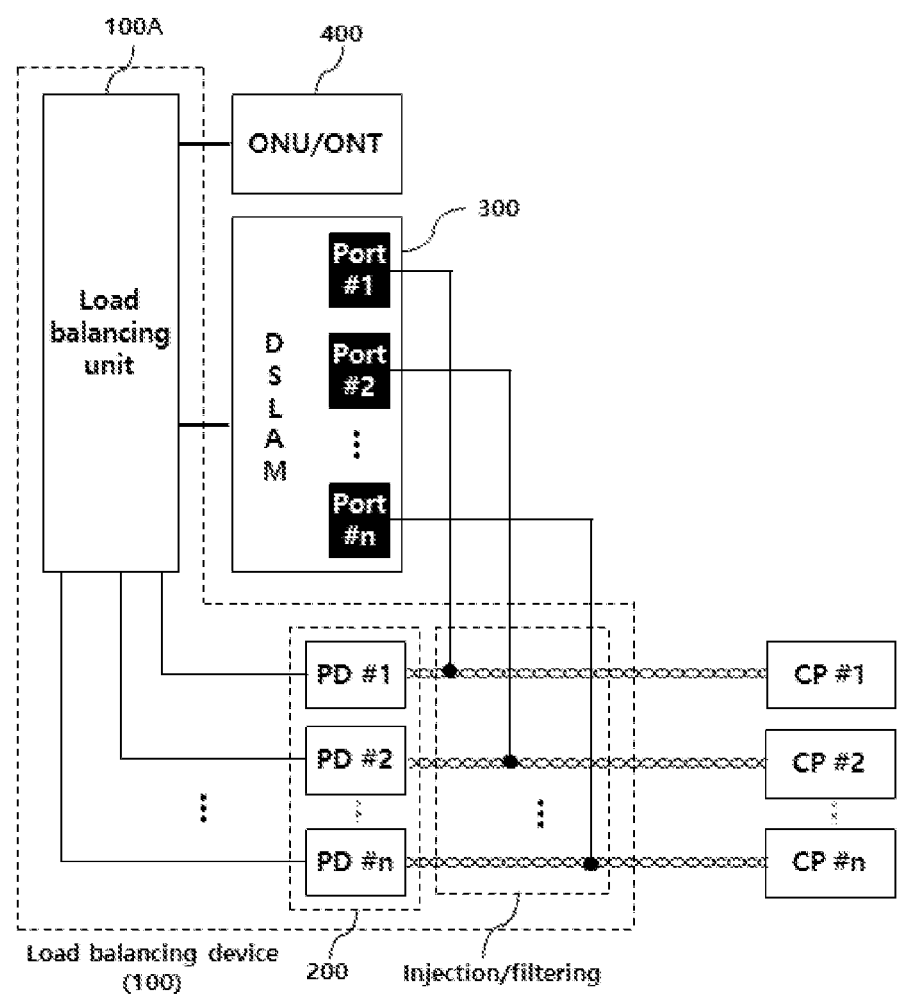
FIG. 3 is a diagram for describing an operation of an apparatus for load balancing among multi-ports in reverse power feeding according to an exemplary embodiment of the present invention.
Figure 4:
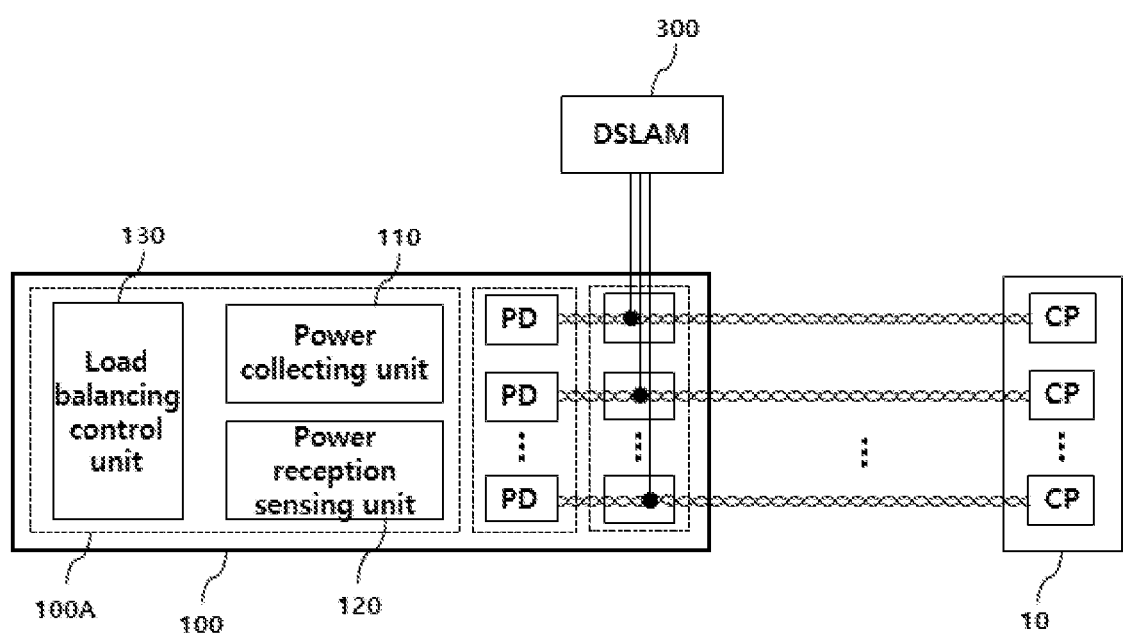
FIG. 4 is a diagram for describing a configuration of an apparatus for load balancing among multi-ports in reverse power feeding according to an exemplary embodiment of the present invention.

FIG. 3 is a diagram for describing an operation of an apparatus for load balancing among multi-ports in reverse power feeding according to an exemplary embodiment of the present invention and FIG. 4 is a diagram for describing a configuration of an apparatus for load balancing among multi-ports in reverse power feeding according to an exemplary embodiment of the present invention.

As illustrated in FIG. 3, the load balancing device 100 receives the reverse power supplied from the multiple CPs through the multiple PDs 200 and the received power is supplied to the ONU/ONT 400 and the DSLAM 300 through the load balancing unit 100A. An operation result of the ONU/ONT 400 and the DSLAM 300 operated on the basis of the power supplied through the load balancing unit 100A inputs and outputs data through each communication port for each subscriber. At this time, power is supplied from the CP to the DPU through the telephone line and data is transmitted and received in both directions. To this end, a data signal from the DSLAM 300 is injected into the telephone line or separated (filtered) from the telephone line and connected to or disconnected from the communication port of the DSLAM 300.

The load balancing device 100 consequently serves to receive the power supplied from the PSE of the reverse power feeding unit provided in each CP via the telephone line at the PD, combine and collect the power, and transmits the combined and collected power to the ONU/ONT 400 and the DSLAM 300 of the DPU 20A.

Meanwhile, as illustrated in FIG. 4, the load balancing device 100 is configured to comprise an injector/filter that serves to couple power and data by accessing at least one CP including the reverse power feeding device or separate the power and the data, at least one PD 200 receiving the power transmitted from the reverse power feeding device, a power collecting unit 110 collecting the power received through the PD, a power reception sensing unit 120 sensing whether the power is received by the reverse power feeding from the multiple CPs 10, and a load balancing control unit 130 allowing the DPU 20A to perform the load balancing for each communication port.

The PDs 200 each configured in accordance with the number of telephone lines receive the power supplied from the CP 10 connected to each telephone line in the reverse direction. The PSE device 510 provided on the CP 10 preferentially detects the PD 200 provided on the DP 20 in order to perform the reverse power feeding.

The detection is performed through the following process.

First, when the PSE device 510 transmits a pulse signal of voltage (e.g., 8 V) HAVING a predetermined magnitude to the PD 200 for several ms and the PD 200 receives the pulse signal from the PSE device 510, a circuit is formed so that constant current flows in response to the received pulse signal and this is a detect signal of the PD 200. At this time, the PSE device 510 knows whether the PD 200 is connected to the line by determining whether the current flows and when the PD 200 is detected according to the signal, the PSE device 510 injects voltage into the telephone line to perform the reverse power feeding. The PD 200 receives power supplied from the PSE device 510 through such a process.

The PD 200 transfers the reverse power received from the PSE device 510 to the power collecting unit 110 of the load balancing unit 100A.

Further, the power collecting unit 110 receives the power transmitted from the PD 200 and combines the power to supply power to the DPU 20A. That is, the power coupled by the power collecting unit 110 is used as a source power for stably distributing power in the at least one DPU 20A provided at the distribution point 20.

In addition, the power reception sensing unit 120 senses the power received from the multiple PDs 200. The power reception sensing unit 120 monitors the power received from each PD 200 constituted for each telephone line or detects whether power is received by the reverse power feeding directly from the line connected to each telephone line. Therefore, the connection state between each port and each CP 10 is checked in real time and the state of the reverse power feeding of each CP 10 is sensed.

That is, the power reception sensing unit 120 monitors the reverse power supplied from the PSE device 510 provided at each CP 10 to sense the interruption of the reverse power feeding at the specific CP 10, so that load balancing may be performed by excluding the corresponding port from which the reverse power feeding is blocked. Meanwhile, the power reception sensing unit 120 may sense whether the reverse power transmission is performed by sensing current by installing a separate ammeter. That is, there is no limitation in the method of detecting the reverse power transmission in the present invention. Therefore, the power reception sensing unit 120 transmits the sensing result to the load balancing control unit 130.

In addition, the load balancing control unit 130 receives information on power reception according to each CP 10 from the power reception sensing unit 120, and supplies the reverse power to the DPU based on the information on whether the power is received to control the load balancing to be performed in real time. The DPU operates according to the power provided as described above. The DPU determines whether to release the link of the corresponding port based on the port information regarding whether the reverse power is supplied for each telephone line provided by the load balancing control unit 130. If there is a communication port where the reverse power transmission is interrupted, the link is immediately released and unnecessary power consumption is prevented.

That is, as the sensing result, when it is sensed that the specific CP 10 stops the supply of the reverse power, the DPU immediately releases the link of the communication port connected to the corresponding CP 10 and allows the corresponding communication port to operate only with respect remaining communication ports other than the corresponding communication port to stably perform the load balancing.

Figure 5:
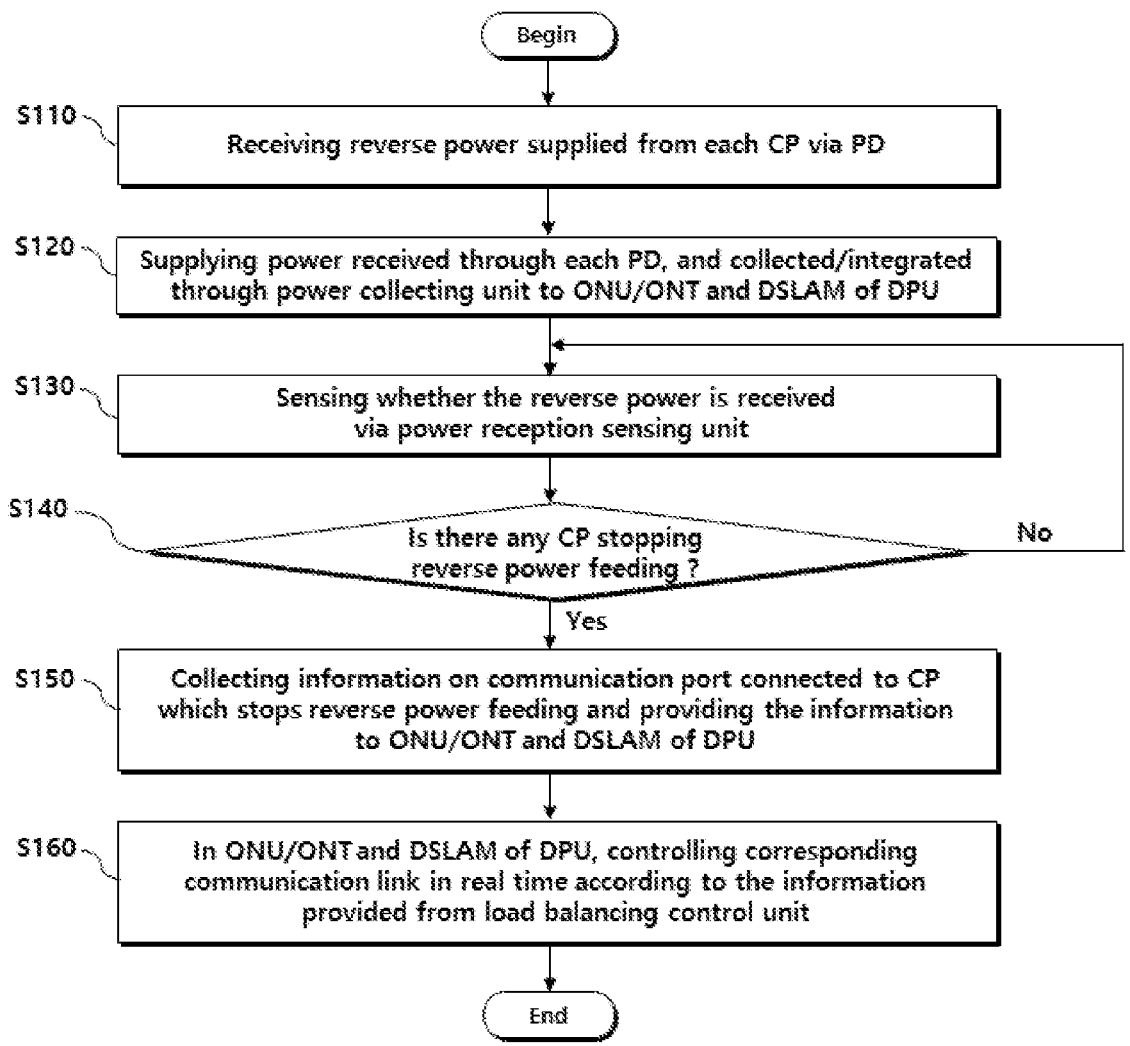
FIG. 5 is a flowchart illustrating a procedure of performing load balancing in reverse power feeding according to an exemplary embodiment of the present invention.

FIG. 5 is a flowchart illustrating a procedure of performing load balancing in reverse power feeding according to an exemplary embodiment of the present invention.

As illustrated in FIG. 5, in the procedure for performing the load balancing among multi-ports, the reverse power supplied from each CP is first received by the PD (S110). Each PD receives power according to a procedure for mutual reverse power transmission of each CP with the PSE and the PSE transmits voltage of the corresponding level according to class information transmitted by the PD.

Next, the power received through each PD is collected and integrated through the power collecting unit 110 and then supplied to the ONU/ONT and the DSLAM of the DPU (S120). The power thus provided is used to provide the communication services to n communication channels.

Then, the power reception sensing unit 120 senses whether the reverse power is received for each telephone line (S130). The power reception sensing unit 120 monitors the power received by the multiple PDs 200 to sense whether power is received by the reverse power feeding or directly senses whether power is received by the reverse power feeding from each of the telephone lines connected to the CP 10.

On the other hand, the load balancing control unit 130 provides the ONU/ONT and the DSLAM of the DPU with the port information on which the reverse power is supplied based on the information of the sensing result to provide information so as to perform the load balancing in real time. Through such a process, the load balancing control unit 130 may know which of multiple circuits is currently used and know at which CP 10 the reverse power feeding is interrupted or blocked.

Next, when there is a CP 10 that stops the reverse power feeding of the sensing result (S140), the load balancing control unit collects information on the communication port connected to the CP which stops the reverse power feeding and transmits the information to the ONU/ONT and DSLAM (S150).

Then, the ONU/ONT and the DSLAM of the DPU controls the corresponding communication link in real time according to the information provided from the load balancing control unit (S160). That is, the information is provided to the ONU/ONT and the DSLAM of the DPU to immediately release the link of the communication port connected to the CP 10 that stops the reverse power feeding.

That is, the ONU/ONT and the DSLAM of the DPU do not perform a separate link releasing process for the corresponding port requiring a long time, and the link of the corresponding communication port is sensed as soon as the CP 10 which stops the reverse power feeding is sensed to stop the xDSL data service to the CP 10 and block unnecessary power consumption by the communication service to the communication port early, thereby reducing the total power consumption of the DPU.

More specifically, while the ONU/ONT and DSLAM of the DPU communicate with each other through the communication port, only CPs that supply power normally supply power when the CP power supply of the other communication ports is interrupted, resulting in unbalanced power supply and demand. In other words, if there is a situation where one CP remaining after being load-balanced by 1/n and supplying power is momentarily required to supply the entire power, only one communication port is not linked but all remaining ports are linked, and as a result, the power consumption of the DPU at this moment requires power for all of n communication ports. Therefore, the power consumption which one CP should bear exceeds a limit thereof, and as a result, the DPU may not normally operate.

In order to solve this problem, when the CP side power supply is released, the communication port link is also turned off to lower the power consumption of the DPU itself so that the remaining CP may bear the power consumption. If such a phenomenon occurs, the load and the power supply are momentarily unbalanced, and as a result, the overall voltage is dropped and the power supply may not even bear the load, resulting in turning off the entirety of the DPU.

In normal cases, one CPU may normally start the DPU, but when viewed from the CP, the DPU may only be provided with consumption power from the CP when the DPU is linked to one port. That is, the more CPs are connected to multiple ports, the smaller the power that the CP will bear.

Conversely, when multiple ports are connected and only one CP is left in operation and the supply of the power to the remaining CPs is interrupted, the CP needs to provide power to the multiple ports in a linked state at that time. It is preferable that the link of the communication port is also turned off at the moment when the power supply is turned off.

The ONU/ONT 400 and the DSLAM 300 of the DPU 20A exclude a specific port connected to the CP 10 that stops supplying the reverse power according to the result sensed by the power reception sensing unit 120 and provides the communication services only to the remaining normal ports.

As described above, in the apparatus and the method for load balancing among multi-ports in reverse power feeding, when performing the reverse power feeding through the telephone line and providing the xDSL communication service while interrupting the reverse power feeding at the specific customer premise, the interruption is rapidly sensed and the communication link of the port connected to the specific customer premise is released to prevent the data service from being provided through the corresponding port any longer and reduce the total power consumption of the DPU 20A, and stably perform the load balancing only with respect to the remaining ports other than the corresponding port.

While the present invention has been particularly illustrated and described with reference to exemplary embodiments thereof, the technical spirit of the present invention is not limited thereto and changes or modifications of each component of the present invention can be made within a technical scope of the present invention in order to achieve the same object and effect.

While the exemplary embodiments of the present invention have been illustrated and described above, the present invention is not limited to the aforementioned specific exemplary embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

What is claimed is:

1. An apparatus for load balancing among multiple communication ports in reverse power feeding, comprises:
   a power reception sensing unit sensing whether reverse power is fed from a plurality of customer premises; and
   a load balancing unit performing the load balancing among the multiple communication ports connected to the customer premises according to the sensing result;
   wherein the load balancing allows the reverse power feeding from the customer premises and power consumption at a distribution point (DP) to be constantly maintained by immediately blocking a communication link of a communication port connected with a specific customer premise from the plurality of customer premises upon detecting interruption of the reverse power feeding from the specific customer premise without performing a communication link release process at a data link layer, excluding the communication port from other communication ports to which communication services are provided, and providing the load balancing only among remaining communication ports.

2. The apparatus of claim 1, wherein the apparatus includes a distribution point unit (DPU) that comprises the multiple communication ports, wherein the DPU is connected with each customer premise through a corresponding communication port, and when the reverse power feeding is interrupted from the specific customer premise, the communication link to the corresponding communication port is immediately blocked so as to reduce the power required for maintaining connection with the link, and the load balancing is performed among the remaining communication ports.

3. The apparatus of claim 1, wherein the power reception sensing unit is configured to sense whether the power by the reverse power feeding is fed directly from a line connected with the specific customer premise, or sense whether the power by the reverse power feeding is received from a powered device (PD).

4. The apparatus of claim 1, the apparatus further comprises:
   a power collecting unit configured to collect the power received from a reverse power feeding device of one of the plurality of customer premises through a powered device (PD),
   wherein the collected power is used as a source power required for stably operating DP side equipments comprising a distribution point unit (DPU) and an ONU/ONT.

5. The apparatus of claim 1, the apparatus further comprises:
   a load balancing control unit configured to control the load balancing by immediately releasing the communication link in the corresponding communication port in real time by receiving information regarding whether power is received for the respective customer premise from the power reception sensing unit and providing port information in which the reverse power feeding is not performed to a distribution point unit (DPU) based on the power reception information.

6. A method for load balancing among multiple communication ports in reverse power feeding, comprises:
   sensing whether reverse power is fed from a plurality of customer premises; and
   performing the load balancing among the multiple communication ports connected to the customer premises according to the sensing result;
   wherein the load balancing allows the reverse power feeding from the customer premises and power consumption at a distribution point to be constantly maintained by immediately blocking a communication link of a communication port connected with a specific customer premise from the plurality of customer premises upon detecting interruption of the reverse power feeding from the specific customer premise without performing a communication link release process at a data link layer, excluding the communication port from other communication ports to which communication services are provided, and providing the load balancing only among remaining communication ports.

7. The method of claim 6, wherein a distribution point unit (DPU) comprises the multiple communication ports, wherein the DPU is connected with each customer premise through a corresponding communication port, and when the reverse power feeding is interrupted from the specific customer premise, the communication link to the corresponding communication port is immediately blocked so as to reduce the power required for maintaining connection with the link, and the load balancing is performed among the remaining communication ports.

8. The method of claim 6, wherein the sensing is performed by sensing whether the power by the reverse power feeding is fed directly from a line connected with the specific customer premise, or sensing whether the power by the reverse power feeding is received from a powered device (PD).

9. The method of claim 6, wherein the method further comprises:
   collecting the power received from a reverse power feeding device of one of the plurality of customer premises through a powered device (PD),
   wherein the collected power is used as a source power required for stably operating DP side equipments comprising a distribution point unit (DPU) and an ONU/ONT.

10. The method of claim 6, the method further comprises:
    controlling the load balancing by immediately releasing the communication link in the corresponding communication port in real time by receiving information regarding whether power is received for the respective customer premise from the sensing and providing port information in which the reverse power feeding is not performed to a distribution point unit (DPU) based on the power reception information.

* * * * *